(12) United States Patent
Muhich et al.

(10) Patent No.: US 11,959,011 B2
(45) Date of Patent: Apr. 16, 2024

(54) HIGH-TEMPERATURE THERMOCHEMICAL ENERGY STORAGE MATERIALS USING DOPED MAGNESIUM-TRANSITION METAL SPINEL OXIDES

(71) Applicants: Christopher Muhich, Phoenix, AZ (US); Jayni Hashimoto, Tempe, AZ (US); Daniel Rivera, Mesa, AZ (US); Harsheen Rajput, Miami, AZ (US)

(72) Inventors: Christopher Muhich, Phoenix, AZ (US); Jayni Hashimoto, Tempe, AZ (US); Daniel Rivera, Mesa, AZ (US); Harsheen Rajput, Miami, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 17/397,495

(22) Filed: Aug. 9, 2021

(65) Prior Publication Data

US 2022/0041913 A1 Feb. 10, 2022

Related U.S. Application Data

(60) Provisional application No. 63/062,649, filed on Aug. 7, 2020.

(51) Int. Cl.
*C09K 5/16* (2006.01)
*C01G 45/12* (2006.01)

(52) U.S. Cl.
CPC ............ *C09K 5/16* (2013.01); *C01G 45/12* (2013.01); *C01G 45/1235* (2013.01);
(Continued)

(58) Field of Classification Search
CPC .......... C09K 5/08; C09K 5/16; F28D 20/003; C01P 2002/32; C01P 2002/54; C01P 2002/72; C01P 2006/32; C01G 45/1235
See application file for complete search history.

(56) References Cited

U.S. PATENT DOCUMENTS

| 9,077,032 B2* | 7/2015 | Doe ...................... C01B 25/372 |
| 2018/0079654 A1* | 3/2018 | Oki ........................... C09K 5/14 |
| 2018/0118576 A1* | 5/2018 | Ahlborg .................. C01B 32/40 |

FOREIGN PATENT DOCUMENTS

WO    WO-2020146361 A1 *  7/2020 ........... F28D 20/003

OTHER PUBLICATIONS

Leonard et al. ("Effects of dopant metal variation and material synthesis method on the material properties of mixed metal ferrites in yttria stabilized zirconia for solar thermochemical fuel production," International Journal of Photoenergy, 2015) (Year: 2015).*

(Continued)

*Primary Examiner* — Matthew R Diaz
(74) *Attorney, Agent, or Firm* — Withrow & Terranova, P.L.L.C.; Vincent K. Gustafson

(57) ABSTRACT

High-temperature thermochemical energy storage materials using doped magnesium-transition metal spinel oxides are provided. —transition metal spinel oxides, such as magnesium manganese oxide $(MgMn)_3O_4$, are promising candidates for high-temperature thermochemical energy storage applications. However, the use of these materials has been constrained by the limited extent of their endothermic reaction. Embodiments described herein provide for doping magnesium-transition metal spinel oxides to produce a material of low material costs and with high energy densities, creating an avenue for plausibly sized modules with high energy storing capacities.

9 Claims, 11 Drawing Sheets

---

PROVIDE A MAGNESIUM-TRANSITION METAL SPINEL OXIDE
400

DOPE THE MAGNESIUM-TRANSITION METAL SPINEL OXIDE WITH A DOPANT METAL TO PRODUCE THE THERMOCHEMICAL ENERGY STORAGE MATERIAL
402

(52) U.S. Cl.
CPC ...... *C01P 2002/32* (2013.01); *C01P 2002/54* (2013.01); *C01P 2002/72* (2013.01); *C01P 2006/32* (2013.01)

(56) References Cited

OTHER PUBLICATIONS

Randhir et al. ("Magnesium-manganese oxides for high temperature thermochemical energy storage," Journal of Energy Storage 21, 2019, 599-610) (Year: 2018).*

King et al. ("Enhancing thermochemical energy storage density of magnesium-manganese oxides," Energy Storage, 2019, 1(5), e83) (Year: 2019).*

King, K. et al., "Enhancing thermochemical energy storage density of magnesium-manganese oxides, " Energy Storage, Aug. 2019, John Wiley & Sons Ltd., 8 pages.

Randhir, K. et al., "Magnesium-manganese oxides for high temperature thermochemical energy storage," Journal of Energy Storage, vol. 21, Dec. 2018, Elsevier Ltd., pp. 599-610.

\* cited by examiner

FIG. 7A
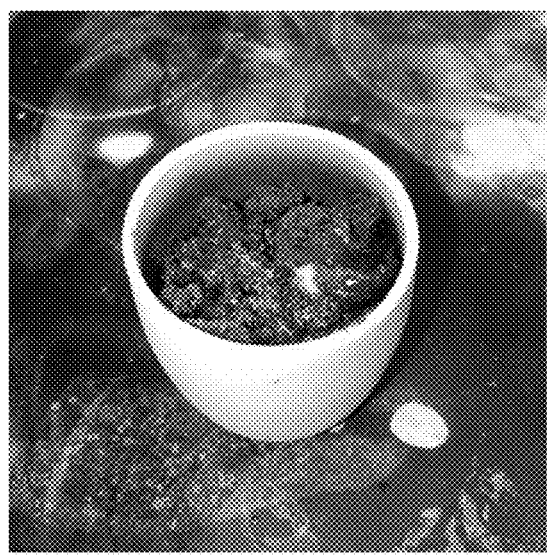
FIG. 7B
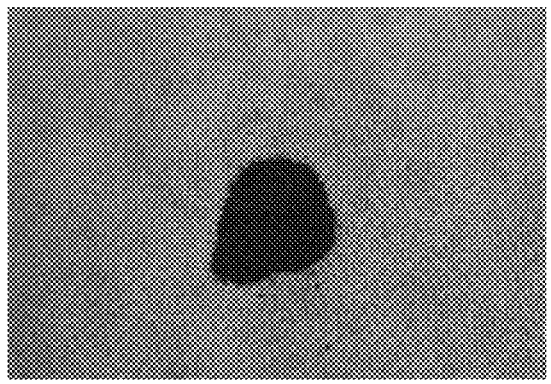 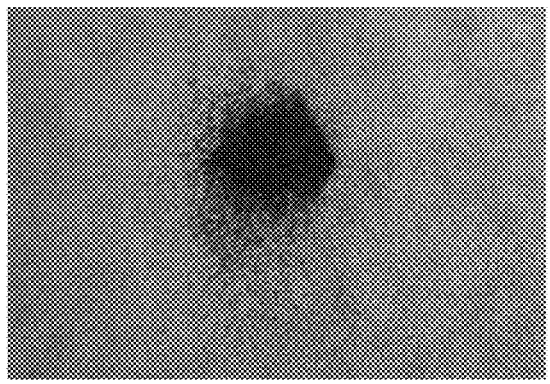
FIG. 7C            FIG. 7D

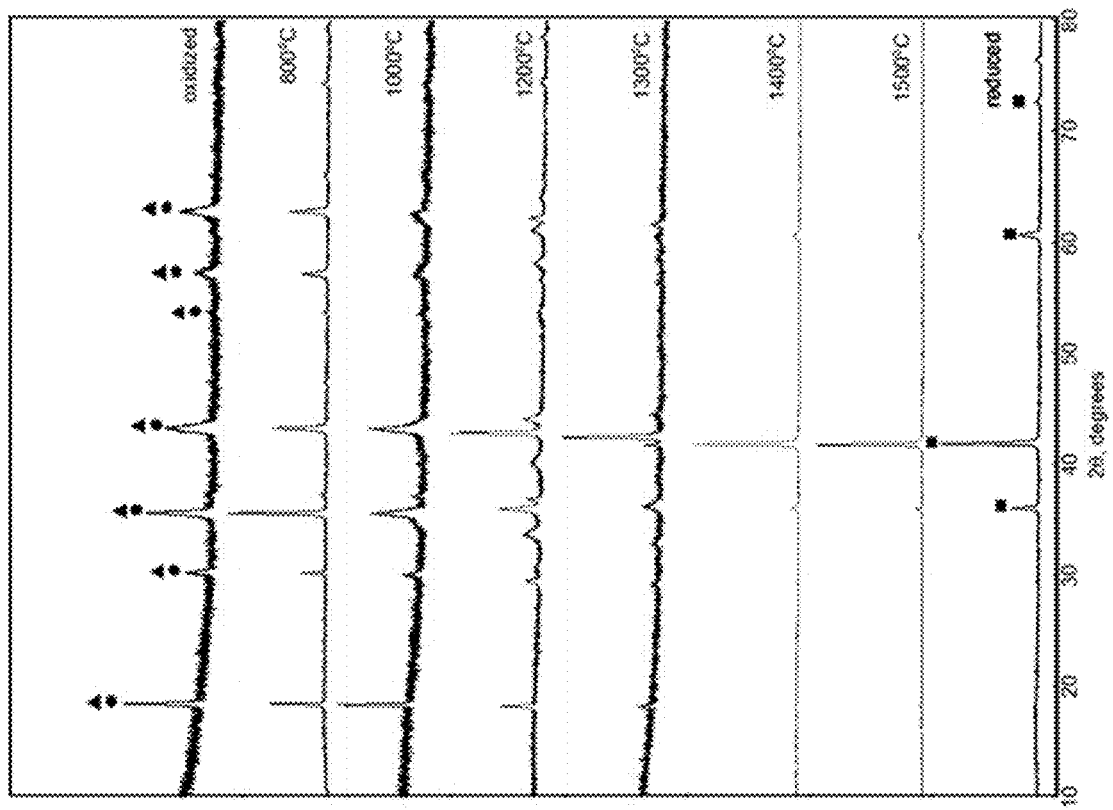
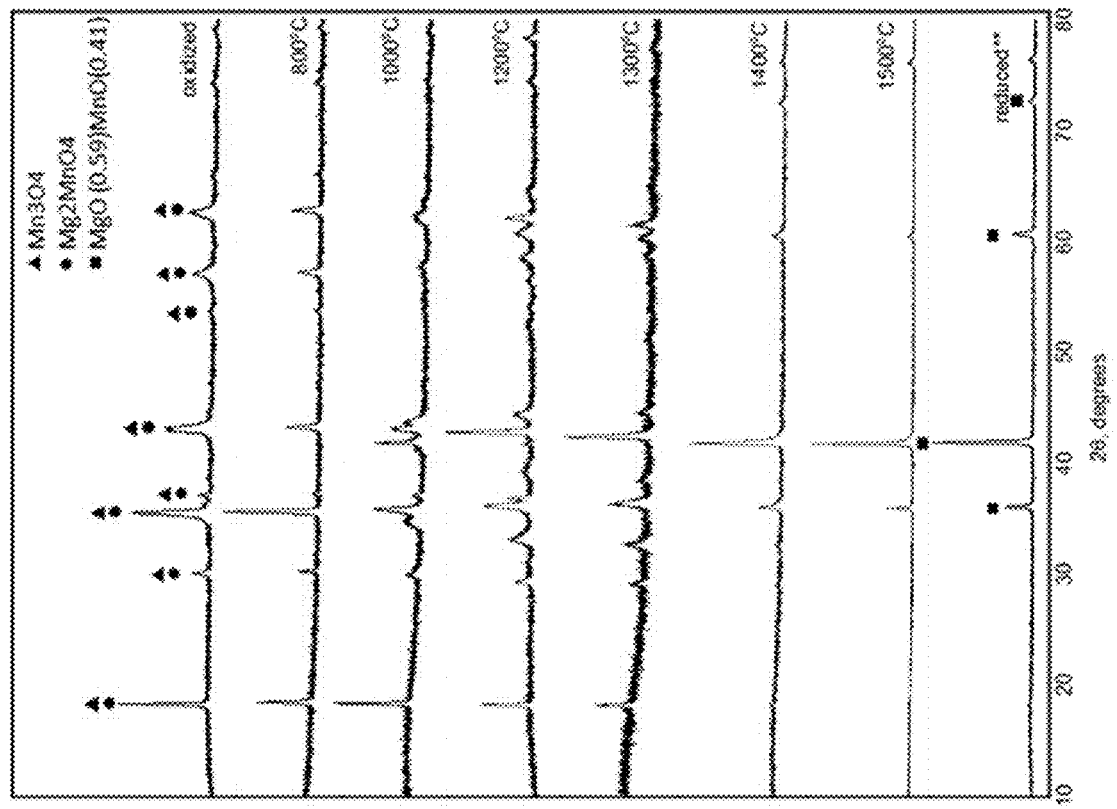
FIG. 9A
FIG. 9B

HIGH-TEMPERATURE THERMOCHEMICAL ENERGY STORAGE MATERIALS USING DOPED MAGNESIUM-TRANSITION METAL SPINEL OXIDES

RELATED APPLICATIONS

This application claims the benefit of provisional patent application Ser. No. 63/062,649, filed Aug. 7, 2020, the disclosure of which is hereby incorporated herein by reference in its entirety.

GOVERNMENT SUPPORT

This invention was made with government support under DE-AR0000991 awarded by the Department of Energy. The government has certain rights in the invention.

FIELD OF THE DISCLOSURE

The present disclosure relates to thermal energy storage materials.

BACKGROUND

High-temperature thermochemical energy storage has promising potential for its ability to couple with existing energy generation methods as well as new and emerging technologies. Thermochemical energy storage allows for thermal energy to be stored via chemical bonds. Utilizing metal oxides enables high temperatures of energy storage, resulting in high-temperature discharge and stable long-term storage. The high operating temperatures allow for high efficiency in heat engines, and the long-term stability of the technology allows for this type of storage to replace current methods or to supplement existing infrastructure in times of peak demand.

SUMMARY

High-temperature thermochemical energy storage materials using doped magnesium-transition metal spinel oxides are provided. Magnesium-transition metal spinel oxides, such as magnesium manganese oxide ($(MgMn)_3O_4$), are promising candidates for high-temperature thermochemical energy storage applications. However, the use of these materials has been constrained by the limited extent of their endothermic reaction. Embodiments described herein provide for doping magnesium-transition metal spinel oxides to produce a material of low material costs and with high energy densities, creating an avenue for plausibly sized modules with high energy storing capacities.

In an illustrative example, $(MgMn)_3O_4$ is doped with a metal, such as iron (Fe), to produce a thermochemical energy storage material with higher energy density capabilities than undoped $(MgMn)_3O_4$. The metal dopant increases the configurational entropy on the cationic sublattice upon reduction, thereby driving the reduction reaction forward to greater extents than without the dopant, resulting in higher storage energy density with minimal sintering effects.

An exemplary embodiment provides a thermochemical energy storage material. The thermochemical energy storage material includes a magnesium-transition metal spinel oxide; and a dopant metal doping the magnesium-transition metal-based spinel oxide to enhance thermochemical energy storage.

Another exemplary embodiment provides a method for producing a thermochemical energy storage material. The method includes providing a magnesium-transition metal spinel oxide; and doping the magnesium-transition metal spinel oxide with a dopant metal to produce the thermochemical energy storage material.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 7A and 7B are images of a sol-gel synthesis according to the Pechini method used to synthesize several doped magnesium manganese oxide samples.

FIG. 7C is an image of an undoped magnesium manganese oxide ($(MgMn)_3O_4$) sample synthesized according to the method of FIGS. 7A and 7B.

FIG. 7D is an image of a 3% iron-doped magnesium manganese oxide ($(MgMn_{0.97}Fe_{0.03})_3O_4$) sample synthesized according to the method of FIGS. 7A and 7B.

FIG. 9A is a graphical representation of material characterization of an undoped magnesium manganese oxide sample illustrating conversion towards reduced form.

FIG. 9B is a graphical representation of material characterization of a 5% iron-doped magnesium manganese oxide sample illustrating conversion towards reduced form.

DETAILED DESCRIPTION

Figure 1:
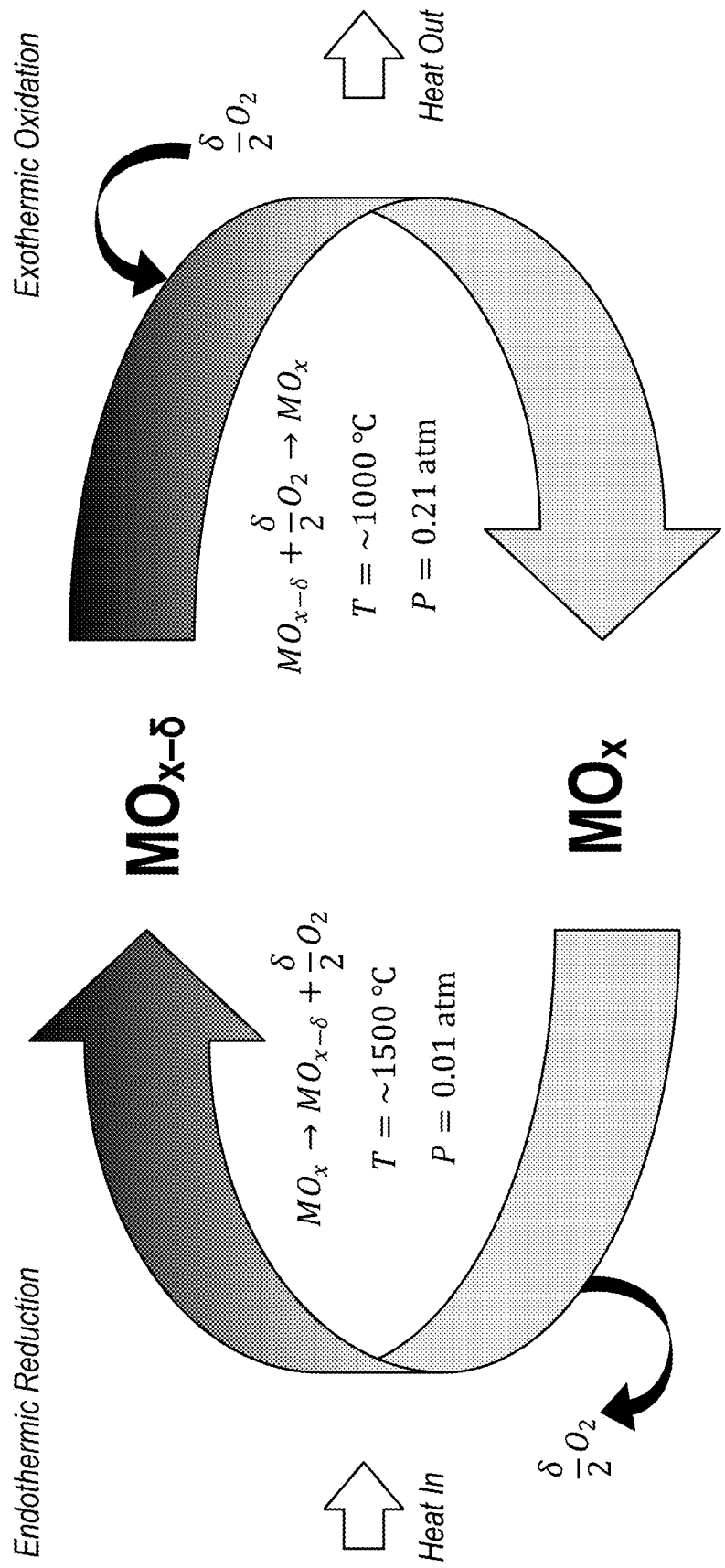
FIG. 1 is a schematic diagram of a thermochemical cycling material for energy storage according to embodiments described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

High-temperature thermochemical energy storage materials using doped magnesium-transition metal spinel oxides are provided. Magnesium-transition metal spinel oxides, such as magnesium manganese oxide ($(MgMn)_3O_4$), are promising candidates for high-temperature thermochemical energy storage applications. However, the use of these materials has been constrained by the limited extent of endothermic reaction. Embodiments described herein provide for doping magnesium-transition metal spinel oxides to produce a material of low material costs and with high energy densities, creating an avenue for plausibly sized modules with high energy storing capacities.

In an illustrative example, $(MgMn)_3O_4$ is doped with a metal, such as iron (Fe), to produce a thermochemical energy storage material with higher energy density capabilities than undoped $(MgMn)_3O_4$. The metal dopant increases the configurational entropy on the cationic sublattice upon reduction, thereby driving the reduction reaction forward to greater extents than without the dopant, resulting in higher storage energy density with minimal sintering effects.

FIG. 1 is a schematic diagram of a thermochemical cycling material for energy storage according to embodiments described herein. In this regard, thermal energy is stored through an endothermic reduction, whereby a metal oxide $MO_x$ absorbs heat to produce a produce a reduced metal oxide $MO_{x-\delta}$ according to the following process.

$$MO_x + \text{Heat} \rightarrow MO_{x-\delta} + \frac{\delta}{2}O_2 \text{ where } \frac{\delta}{2}O_2 \qquad \text{Equation 1}$$

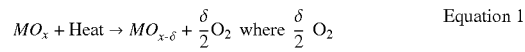

represents oxygen released during the endothermic process.

The stored energy is later released through exothermic oxidation of the reduced metal oxide $MO_{x-\delta}$ according to the following process.

$$MO_{x-\delta} + \frac{\delta}{2}O_2 \rightarrow MO_x + \text{Heat} \qquad \text{Equation 2}$$

The thermochemical cycling material can thus cycle through the processes of Equations 1 and 2 repeatedly to store and later release thermal energy.

Embodiments described herein develop improved thermochemical energy storage materials for application as stationary and/or portable long-term energy storage. For example, embodiments can be used to store thermal energy from heat engines, such as electrical power production facilities and other natural and artificial heat sources. The stored thermal energy can then be used at a later time and/or another location for electrical energy generation, high-heat industrial processes, and other commercial or non-commercial uses.

Improved thermochemical energy storage materials described herein dope magnesium-transition metal spinel oxides (e.g., any spinel oxide which includes magnesium and a transition metal) with small amounts of metal dopants. This is described further below using doped magnesium manganese oxide as an illustrative embodiment.

Research in the ability of different transition methods has been previously conducted and has identified manganese oxide as a promising metal oxide to use in thermochemical energy storage. However, the use of manganese oxides has been limited by the low reaction temperature of the oxide, and thus a low energy/oxygen storage capacity, and a low melting temperature, leading to sintering and materials deactivation. The addition of magnesium has been shown to stabilize the manganese oxide. The mixed metal oxide operates at high temperatures without sintering effects and has a high energy density (~1626 megajoules per cubic meter (MJ m$^{-3}$)).

Figure 2:
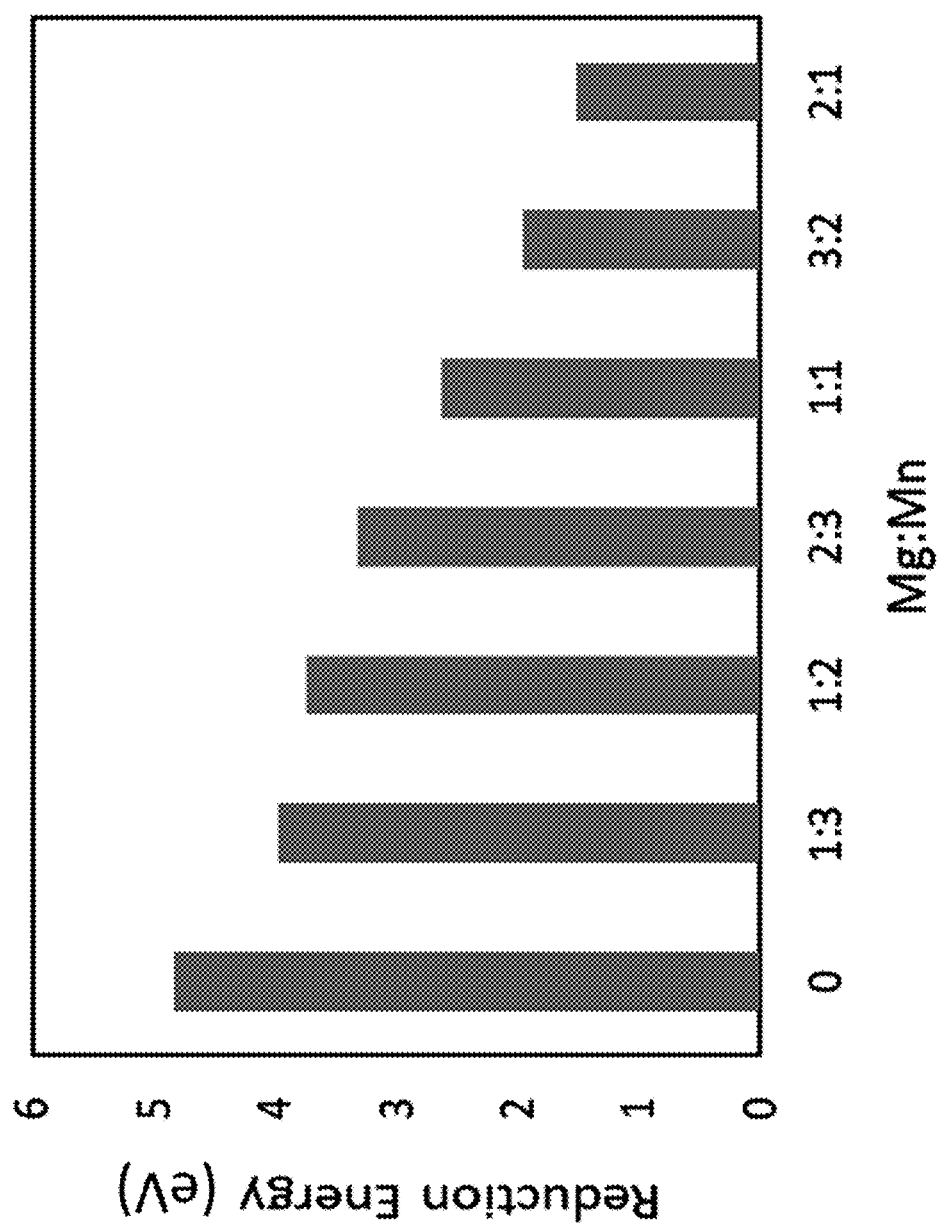
FIG. 2 is a graphical representation of theoretical reduction energy with increasing magnesium content in a magnesium manganese oxide.
Figure 3:
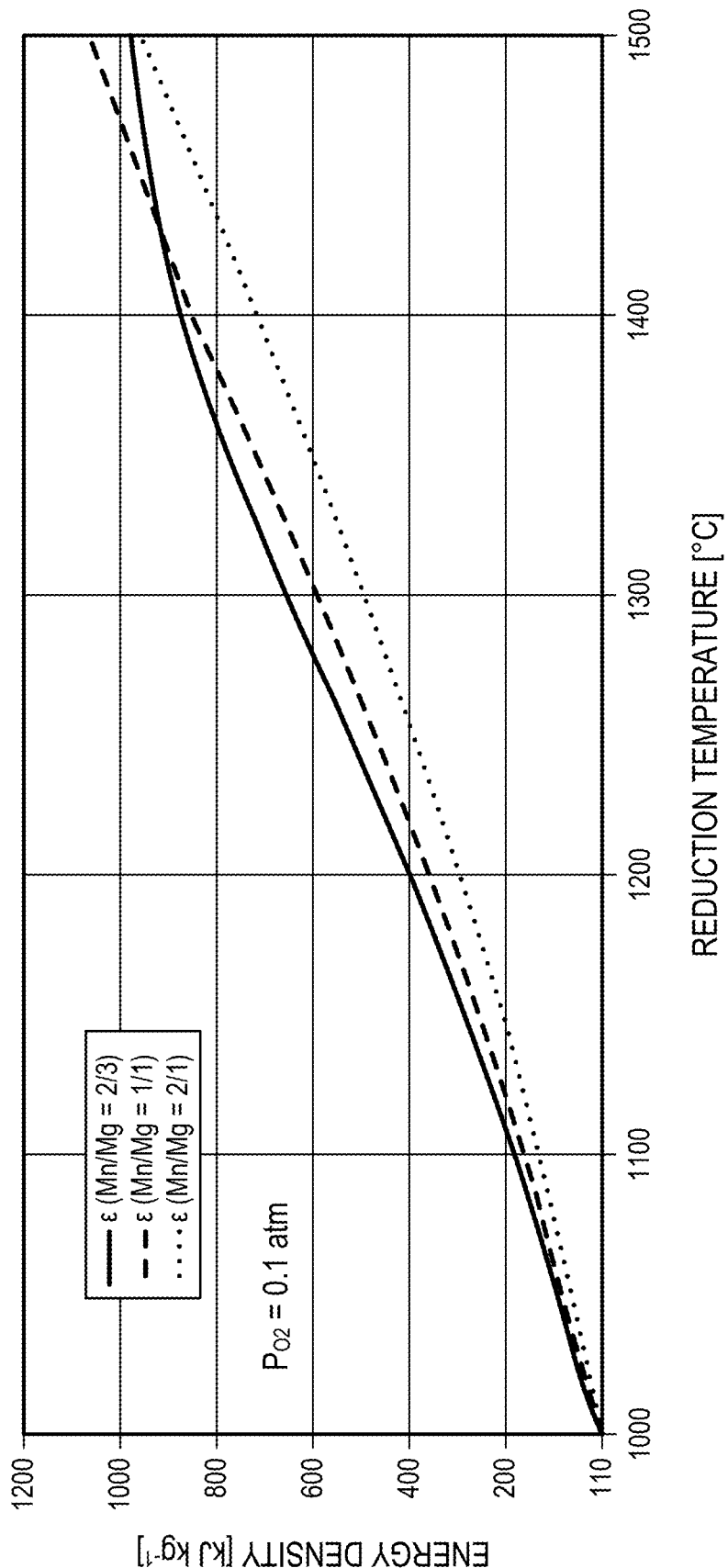
FIG. 3 is a graphical representation of experimental energy density as a function of reduction temperature.

FIG. 2 is a graphical representation of theoretical reduction energy with increasing magnesium content in a magnesium manganese oxide. FIG. 3 is a graphical representation of experimental energy density as a function of reduction temperature. The optimal magnesium-to-manganese ratio is found to be ~1:1 (e.g., within a 15% tolerance or a 5% tolerance of a 1:1 ratio), such that variation from this ratio decreases the energy stored in the material. An increase in magnesium content has been shown to increase the extent of reduction but to decrease the energy stored per mol of reaction, whereas a decrease in magnesium content has been shown to increase the energy stored per mol of reaction but to decrease the extent of reduction. To increase the energy stored, the entropy of reduction must be increased.

An exemplary embodiment includes additional metal dopants (e.g., iron, nickel, calcium, and cerium) to magnesium manganese oxide at small concentrations (e.g., <10%). This doping increases the entropy of reduction and thus increases the extent of the reaction and energy stored. The thermochemical energy storage material of embodiments using doped magnesium manganese oxide $(A_y Mg_x Mn_{1-x-y})_3 O_4$ (where $A_y$ represents an appropriate dopant metal, such as a transition metal, an alkali metal, or another metal) is 11% more active than the base magnesium manganese oxide $(Mg_x Mn_{1-x})_3 O_4$ material. Of the elements investigated, iron provided the greater improvement in the extent of the reaction and the energy stored.

More generally, the addition of metal dopants can be applied to any magnesium-transition metal spinel oxides (e.g., $(MgX)_3 O_4$, where X is any transition metal) to provide similar improvements. For example, magnesium ferrite can be doped with calcium (Ca) to improve the extent of the endothermic reaction and the energy stored. This can also be applied to magnesium nicolate, magnesium cobaltite, and magnesium chromate.

Doping has a significant effect on the efficiency and economics of the reduction cycles, the cycles being dependent on the extent of reduction achievable per cycle. The dopant metal can be any dopant or substituting material which can replace a small portion of the magnesium or transition metal in the base spinel oxide material. Dopant metals can be any metal, alkali metal, or transition metal which is chemically similar to one or both base materials. Generally, a dopant metal is able to take on a +2, +3, +4, or +5 oxidation state in the oxidized form and a +2 state in the reduced form.

Figure 4:
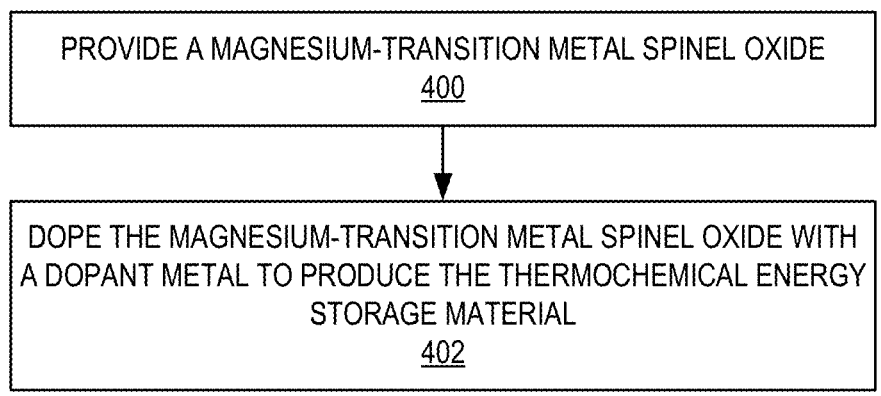
FIG. 4 is a flow diagram of an exemplary process for producing a thermochemical energy storage material.
Figure 5:
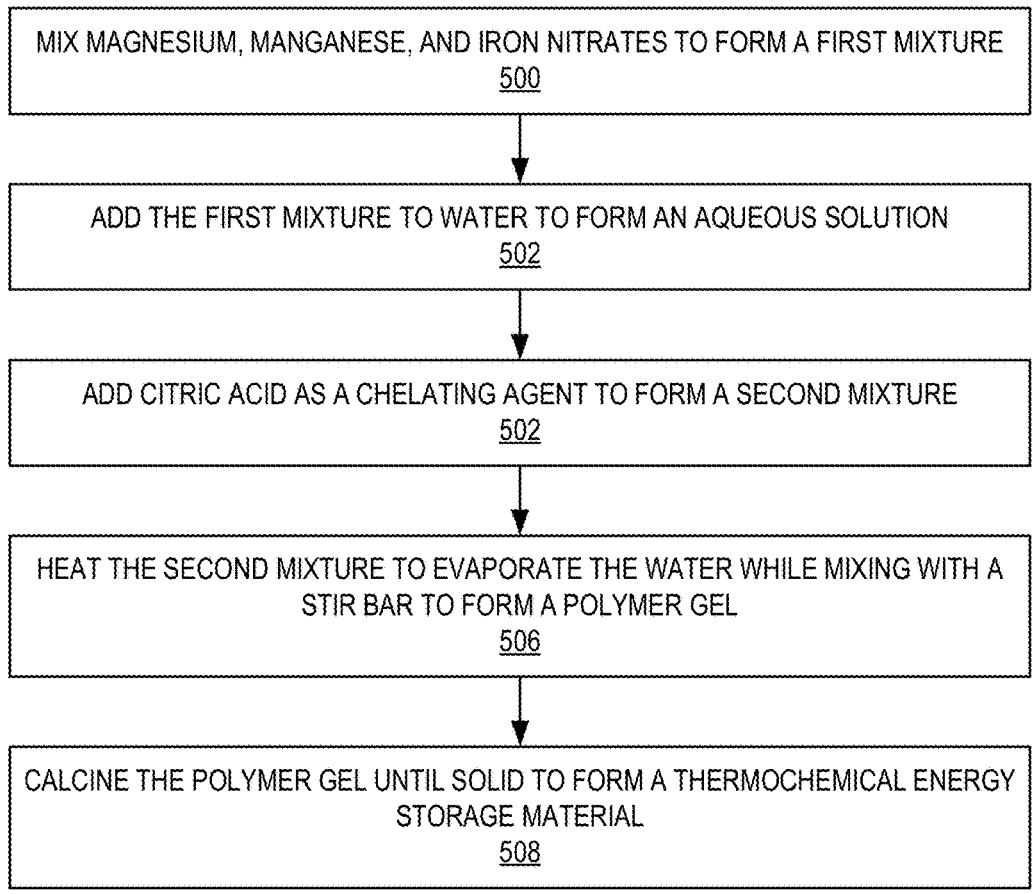
FIG. 5 is a flow diagram of a first illustrative doping process for doped magnesium manganese oxide using a modified sol-gel process.
Figure 6:
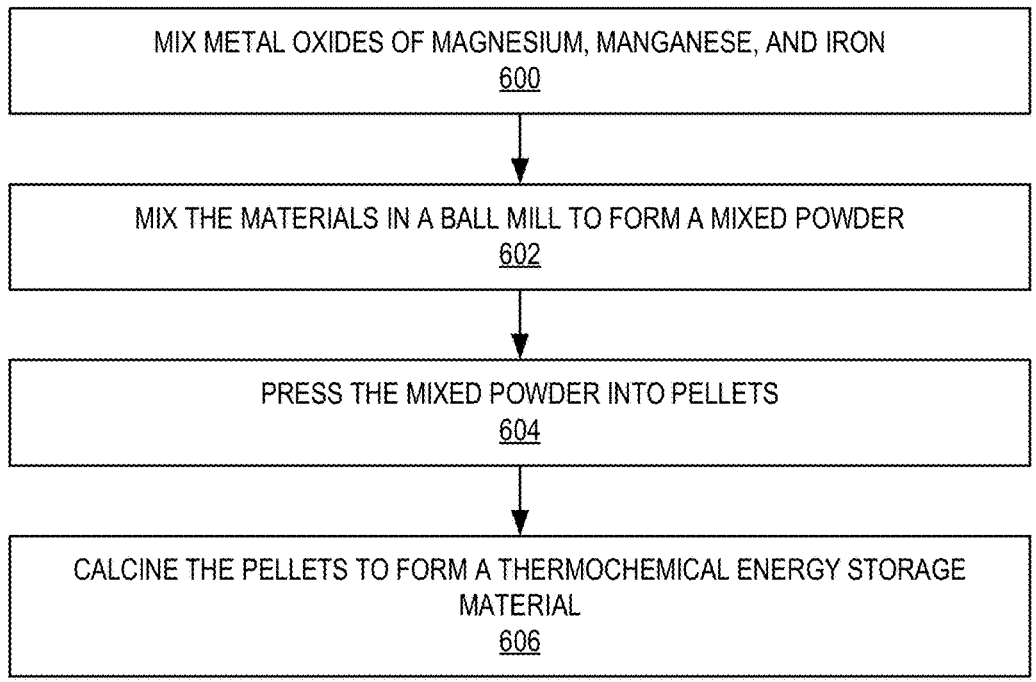
FIG. 6 is a flow diagram of a second illustrative doping process for doped magnesium manganese oxide using a milling process.

FIG. 4 is a flow diagram of an exemplary process for producing a thermochemical energy storage material. The process includes providing a magnesium-transition metal spinel oxide (block 400). The process further includes doping the magnesium-transition metal spinel oxide with a dopant metal to produce the thermochemical energy storage material (block 402). The magnesium-transition metal spinel oxide can be doped with an appropriate doping process, such as a solution-based doping process, a milling process, a salt-based doping process, a vapor deposition process, spray drying, a solid-state process, atomic layer deposition, or sputtering. FIGS. 5 and 6 illustrate example doping processes for magnesium manganese oxide base materials.

FIG. 5 is a flow diagram of a first illustrative doping process for doped magnesium manganese oxide using a modified sol-gel process. In an iron-doped embodiment, magnesium, manganese, and iron nitrates are mixed to form a first mixture (block 500). The first mixture is added to water (or ethylene glycol) to form an aqueous solution (block 502). Citric acid is added as a chelating agent to form a second mixture (block 504). Then the second mixture is heated to evaporate the water (or ethylene glycol) while being mixed with a stir bar, forming a polymer gel (block 506). After the solution polymerizes, it is calcined in air (e.g., at 1500° C.) for 24 hours (block 508), forming the final material. The resulting powder can be crushed using a pestle and mortar to be processed into a fine and even powder or can be pressed into pellets.

FIG. 6 is a flow diagram of a second illustrative doping process for doped magnesium manganese oxide using a milling process. Metal oxides of manganese, magnesium, and iron are mixed, optionally with paraffin wax (block 600). The materials are then mixed (e.g., for 12 to 24 hours or longer) in a ball mill to form a mixed powder (block 602). The mixed powder is then pressed into pellets (block 604) and calcined in air (e.g., at 1500° C.) for 24 hours, forming the final material (block 606).

Sample thermochemical energy storage materials according to the embodiments described herein were synthesized and evaluated. Synthesis of doped magnesium manganese oxide samples are described with reference to FIGS. 7A-7D. Evaluation of the samples is described with reference to FIGS. 8-13.

FIGS. 7A and 7B are images of a sol-gel synthesis according to the Pechini method used to synthesize several doped magnesium manganese oxide samples. A number of samples were synthesized according to the Pechini method:

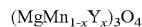

where Y=Fe and Ce, x=0.005, 0.03, 0.05
where Y=Ni, x=0.03, 0.05

where Y=Ca, z=0.005, 0.03, 0.05

FIG. 7C is an image of an undoped magnesium manganese oxide $(MgMn)_3 O_4$ sample synthesized according to the method of FIGS. 7A and 7B. FIG. 7D is an image of a 3% iron-doped magnesium manganese oxide $(MgMn_{0.97} Fe_{0.03})_3 O_4$ sample synthesized according to the method of FIGS. 7A and 7B.

Iron doping at a 3% doping concentration in a reduction extent of −0.0728 mol $O_2$/mol material at 1500° C. and 0.1 atm provides an 11.1% increase over undoped $MgMnO_3$, which only has a reduction extent of −0.0655 mol $O_2$/mol material. While iron produces the largest effect, calcium, cerium, and nickel also increase reduction by 10.2%, 5.2%, and 5.5%, respectively. The effect of doping is not universal or unending. Increases in the dopant concentration beyond ~5% show diminished results compared with the undoped material. This shows that the effect is from doping rather than from alloying. The doped materials do not exhibit sintering effects.

Figure 8:
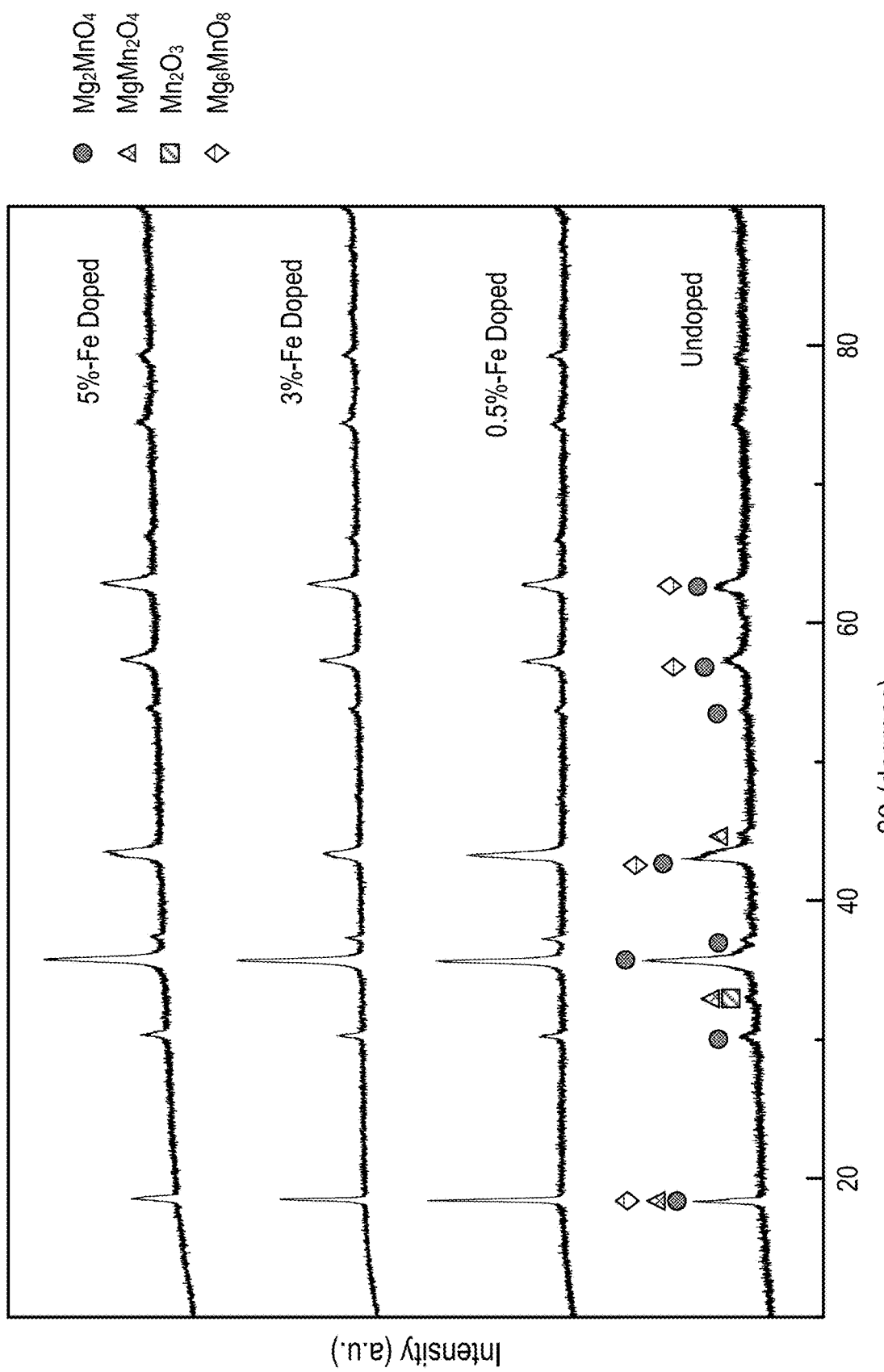
FIG. 8 is a graphical representation of material characterization of undoped magnesium manganese oxide and iron-doped magnesium manganese oxide samples at 0.5%, 3%, and 5%.

FIG. 8 is a graphical representation of material characterization of undoped magnesium manganese oxide and iron-doped magnesium manganese oxide samples at 0.5%, 3%, and 5%.

FIG. 9A is a graphical representation of material characterization of an undoped magnesium manganese oxide sample illustrating conversion towards reduced form. FIG. 9B is a graphical representation of material characterization of a 5% iron-doped magnesium manganese oxide sample illustrating conversion towards reduced form. These figures illustrate that adding iron as a dopant results in faster conversion towards reduced form.

Figure 10:
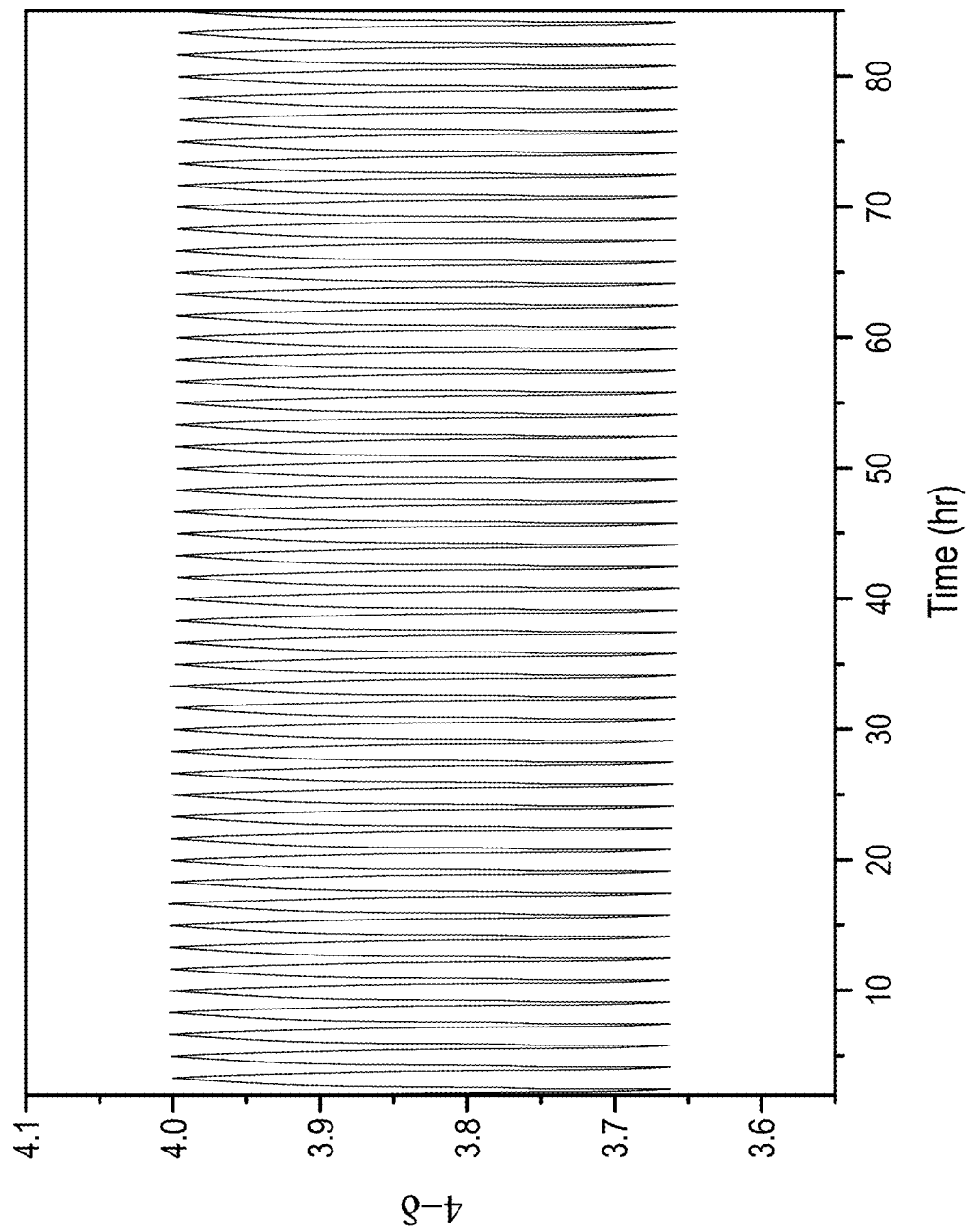
FIG. 10 is a graphical representation of cycling a 3% iron-doped magnesium manganese oxide sample through endothermic reduction and exothermic oxidation.

FIG. 10 is a graphical representation of cycling a 3% iron-doped magnesium manganese oxide sample through endothermic reduction (i.e., energy storage) and exothermic oxidation (i.e., energy release). This illustrates that the doped material maintains stable reactivity of 50 cycles.

Figure 11:
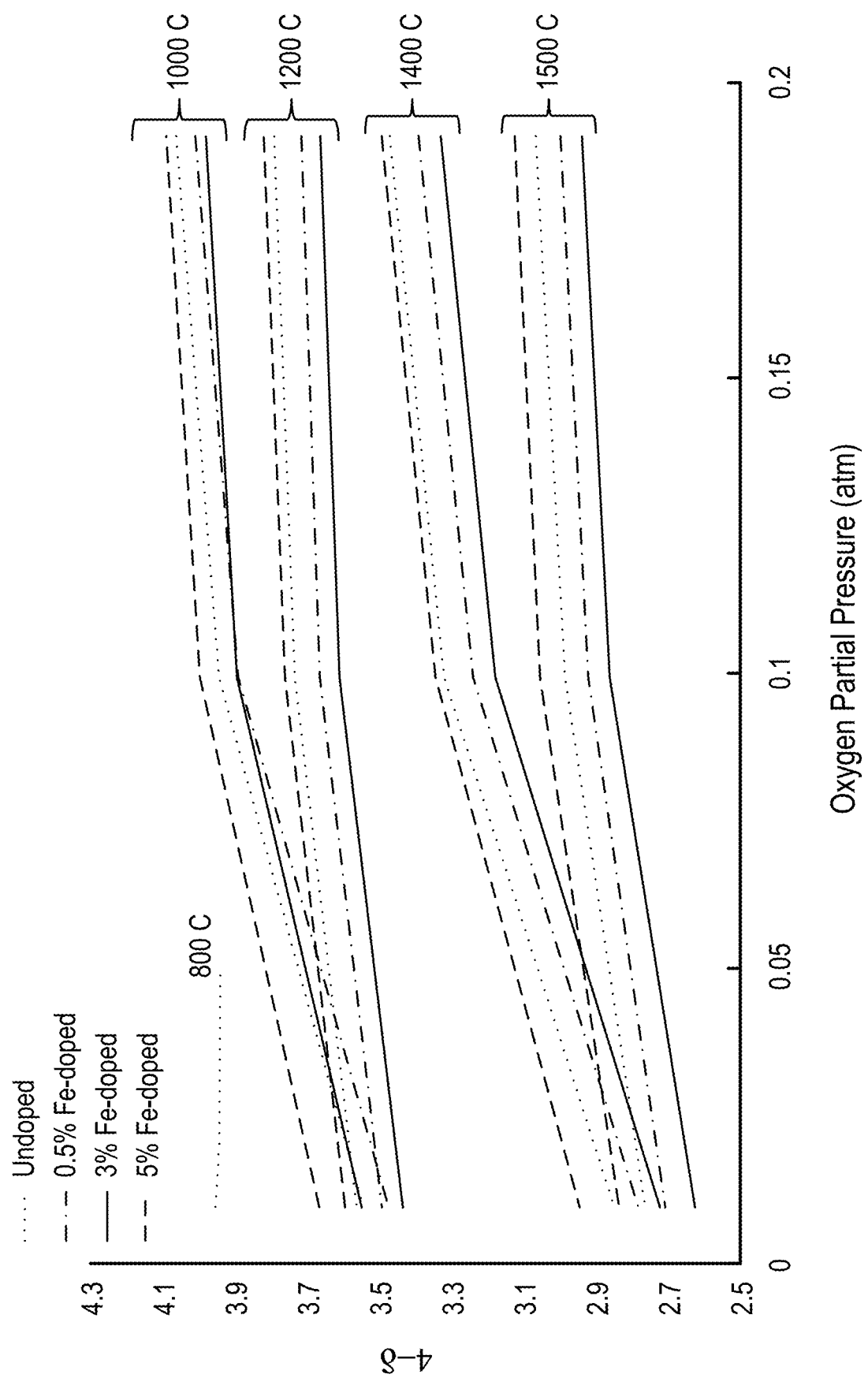
FIG. 11 is a graphical representation of material reduction as a function of oxygen partial pressure at various temperatures for undoped magnesium manganese oxide and iron-doped magnesium manganese oxide samples at 0.5%, 3%, and 5%.

FIG. 11 is a graphical representation of material reduction as a function of oxygen partial pressure at various temperatures for undoped magnesium manganese oxide and iron-doped magnesium manganese oxide samples at 0.5%, 3%, and 5%. The 3% iron-doped magnesium manganese oxide sample shows the largest increase in reductive capability among these samples.

Figure 12:
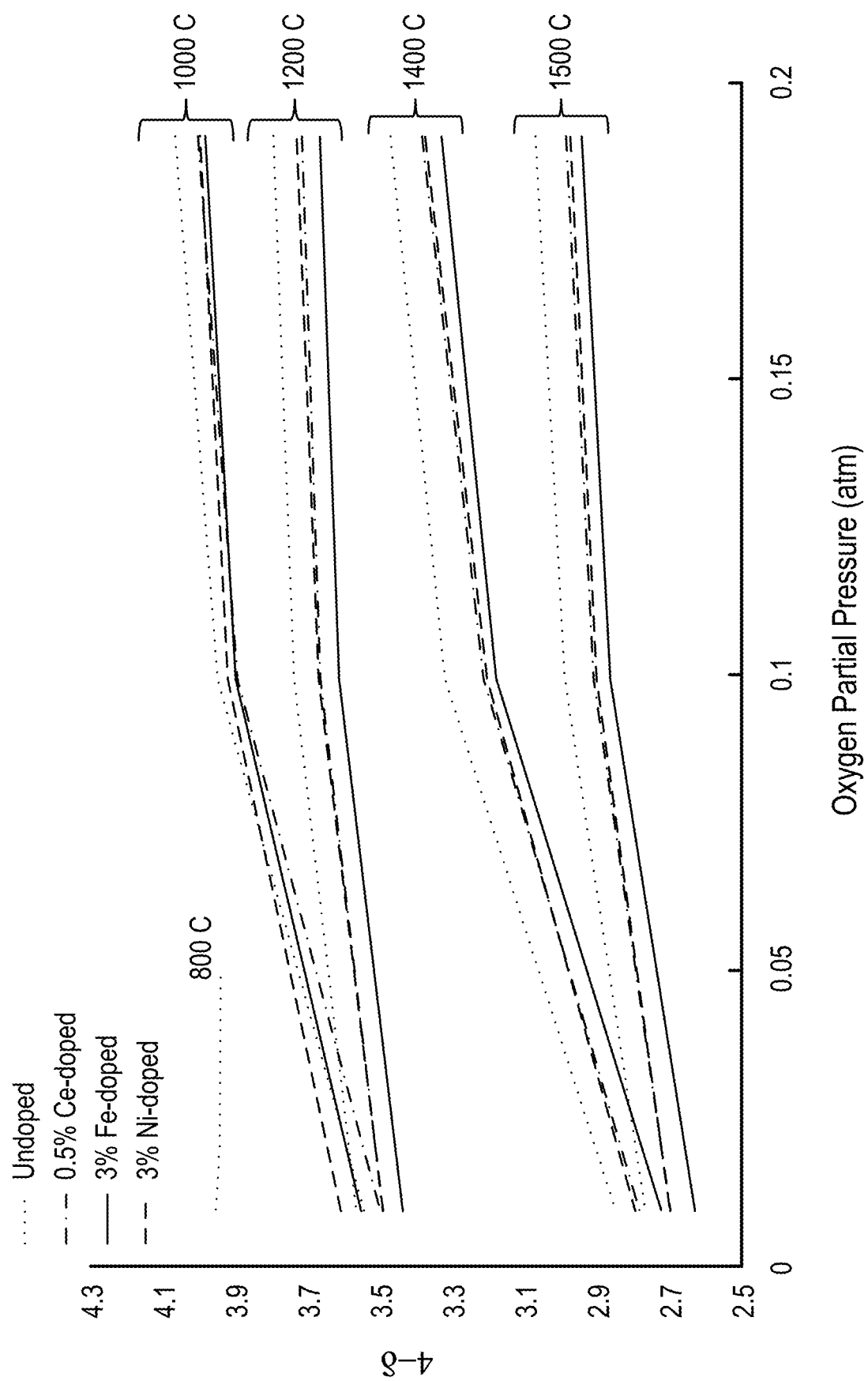
FIG. 12 is a graphical representation of material reduction as a function of oxygen partial pressure at various temperatures for undoped magnesium manganese oxide, 0.5% cerium-doped magnesium manganese oxide, 3% iron-doped magnesium manganese oxide, and 3% nickel-doped magnesium manganese oxide samples.

FIG. 12 is a graphical representation of material reduction as a function of oxygen partial pressure at various temperatures for undoped magnesium manganese oxide, 0.5% cerium-doped magnesium manganese oxide, 3% iron-doped magnesium manganese oxide, and 3% nickel-doped magnesium manganese oxide samples. The 3% iron-doped magnesium manganese oxide sample shows the largest increase in reductive capability (11%) among these samples.

Those skilled in the art will recognize improvements and modifications to the preferred embodiments of the present disclosure. All such improvements and modifications are considered within the scope of the concepts disclosed herein and the claims that follow.

What is claimed is:

1. A thermochemical energy storage material, comprising:
   a magnesium-transition metal spinel oxide that comprises magnesium manganese oxide; and
   a dopant metal doping the magnesium-transition metal spinel oxide to enhance thermochemical energy storage, the dopant metal comprising at least one of iron (Fe) or nickel (Ni), and the dopant metal being a substituting material for manganese (Mn) in the magnesium-transition metal spinel oxide;
   wherein the thermochemical energy storage material has the formula $(MgMn_{1-x}Y_x)_3O_4$, where $Y_x$ represents the dopant metal, and a ratio of magnesium (Mg) to manganese (Mn) is 1:1 within a 15% tolerance.

2. The thermochemical energy storage material of claim 1, wherein the dopant metal can take on one of a +2, a +3, a +4, or a +5 oxidation state when the thermochemical energy storage material is in an oxidized form and a +2 state when the thermochemical energy storage material is in a reduced form.

3. The thermochemical energy storage material of claim 1, wherein the dopant metal comprises iron (Fe).

4. The thermochemical energy storage material of claim 3, wherein x is between 0.025 and 0.035.

5. The thermochemical energy storage material of claim 1, wherein the dopant metal comprises nickel (Ni).

6. The thermochemical energy storage material of claim 1, wherein x is between 0.0001 and 0.10.

7. The thermochemical energy storage material of claim 1, wherein x is no greater than 0.05.

8. The thermochemical energy storage material of claim 1, wherein x is at least 0.005, and the ratio of magnesium (Mg) to manganese (Mn) remains 1:1 within a 15% tolerance.

9. The thermochemical energy storage material of claim 1, wherein the ratio of magnesium (Mg) to manganese (Mn) is 1:1 within a 5% tolerance.

* * * * *